May 21, 1963 R. C. BRITTON ETAL 3,090,504
APPARATUS FOR STACKING SLAB-LIKE ELONGATED ARTICLES ON EDGE
Filed Feb. 24, 1960 3 Sheets-Sheet 1
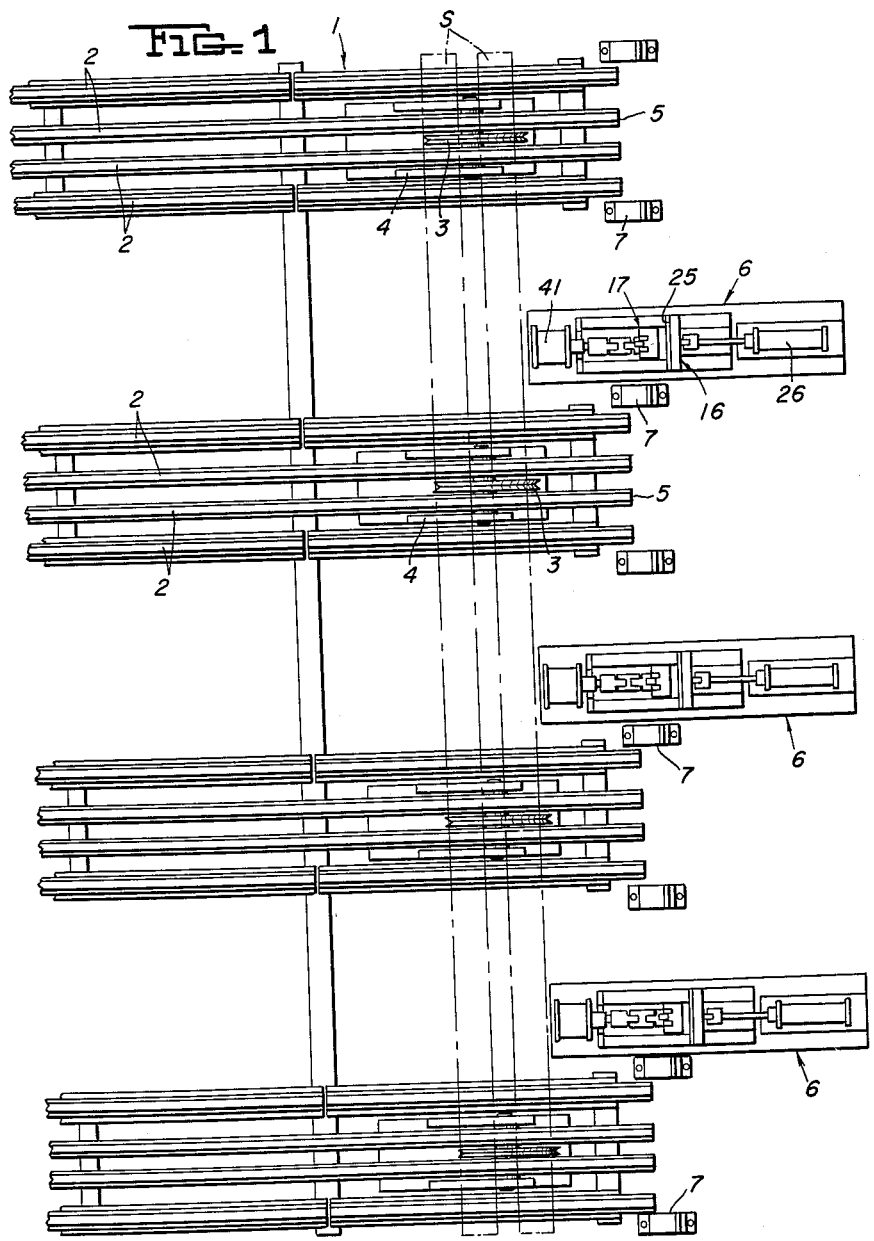
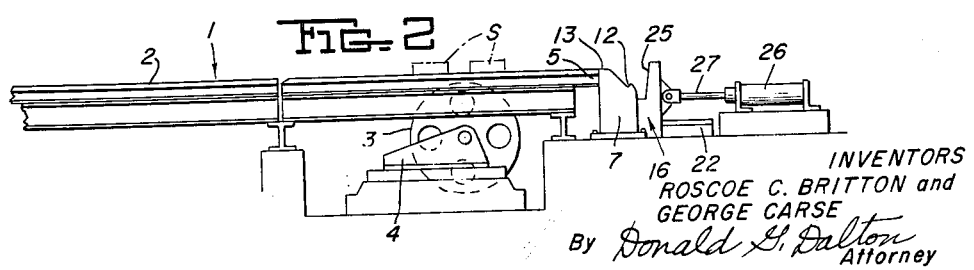
INVENTORS
ROSCOE C. BRITTON and
GEORGE CARSE
By Donald G. Dalton
Attorney

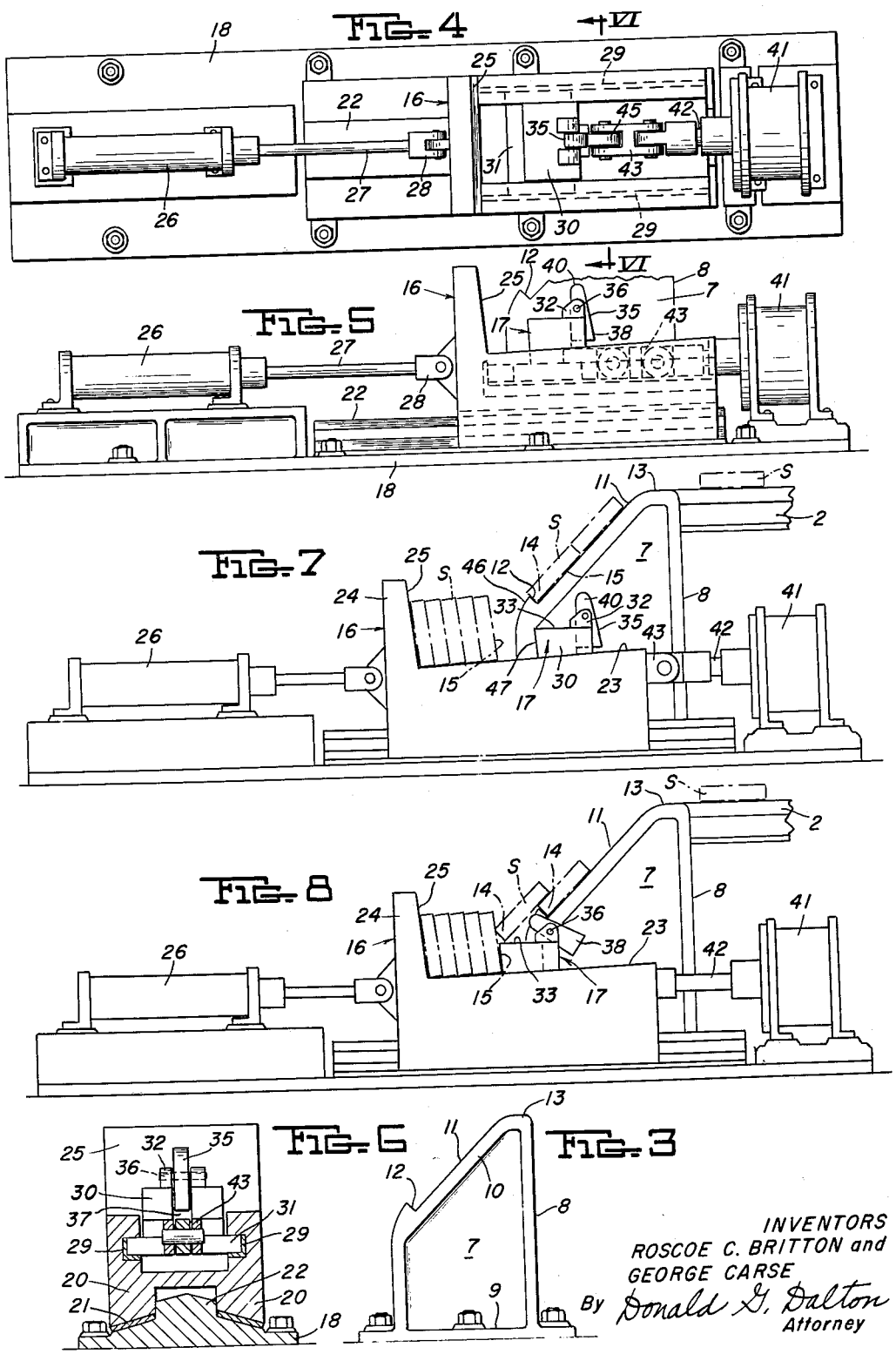

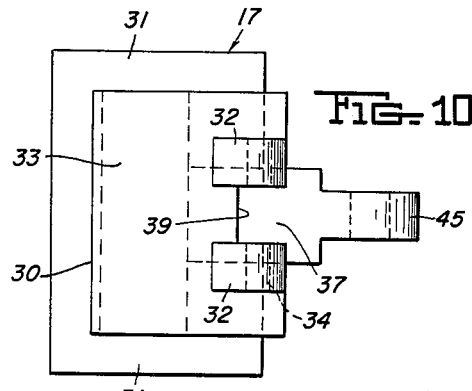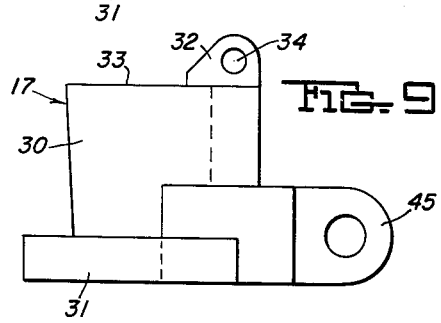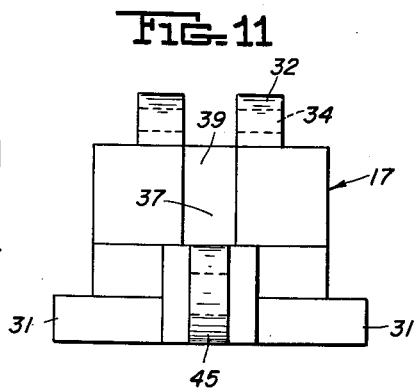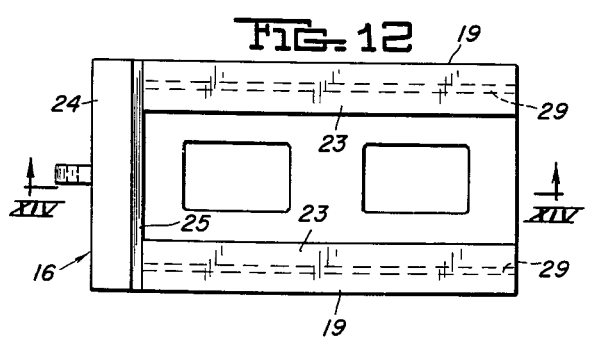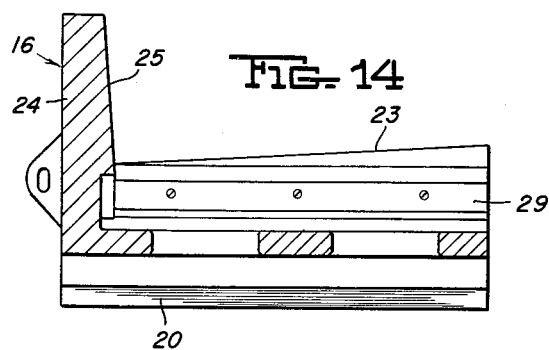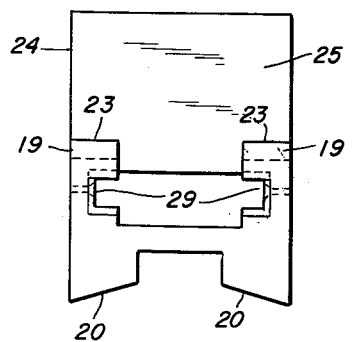
INVENTORS
ROSCOE C. BRITTON and
GEORGE CARSE
By Donald G. Dalton
Attorney

United States Patent Office 3,090,504
Patented May 21, 1963

3,090,504
APPARATUS FOR STACKING SLAB-LIKE ELONGATED ARTICLES ON EDGE
Roscoe C. Britton, 4401 Vermont Court, Gary, Ind., and George Carse, Box 1093, Cedar Lake, Ind.
Filed Feb. 24, 1960, Ser. No. 10,599
15 Claims. (Cl. 214—7)

This invention relates to an apparatus for stacking elongated articles and, more particularly, to an apparatus for stacking steel slabs or billets as they are discharged successively from a rolling mill transfer table. In a manner to be described, the invention contemplates a stacking mechanism that operates in conjunction with a rolling mill slab-transfer table to assemble the slabs in stacks in which they are arranged respectively in vertical on edge positions.

Steel slabs are commonly rolled in different sizes, which by way of example may have a length of from 20 to 30 feet, a width of from 4¼ to 8 inches, and a thickness of from 2½ to 3 inches. At the end of the rolling operation, they are delivered by a run-out roller conveyor to a transfer table over which they are moved successively in a sidewise direction by transfer dogs. According to conventional practice, the slabs, after a sufficient number has accumulated at the end of the transfer table, are lifted by a crane magnet and transferred to a dock area where workmen stack the slabs, handling each slab individually, and wire the stack for loading on rail cars and transport to other locations. The manual handling required by the conventional practice of stacking slabs in the manner described above is troublesome, time-consuming, and further subjects the workmen performing the handling operations to hazard.

One of the principal objects of this invention is to provide a slab stacking apparatus that eliminates the manual handling required by conventional practices, and which reduces the crane-time required thereby for stacking of the slabs.

A further object of the invention is to provide a slab stacking apparatus which, in conjunction with a conventional transfer table, operates to receive the slabs as they are discharged successively from an end of the transfer table and to assemble them in stacked position for wiring and subsequent transfer by rail cars or other conveyors to mill storage yards.

Another object of the invention is to provide a slab stacking apparatus of the character referred to above that is comprised of a slab stacking machine and a transfer mechanism for delivering the slabs from the transfer table to the stacking machine. Another and related object of the invention is to provide a slab-transfer mechanism of this character which comprises a plurality of pedestal supports that receive the slabs as they are discharged over an edge of the transfer table and operate to support them in a vertically inclined edgewise position. The stacking machine in a manner to be described and according to a further object of the invention includes a reciprocating carriage that operates in one direction of reciprocating movement to remove the lowermost slab from the transfer pedestals and in an opposite direction of reciprocating movement to effect the delivery of the slab so removed to a stacking platform that forms a part of the stacking machine.

Other objects and advantages of the invention will become apparent from the following description.

In the drawings, there is shown a preferred embodiment of the invention. In this showing:

FIGURE 1 is a plan view showing the arrangement of the slab stacking apparatus of this invention with respect to a conventional rolling mill transfer table over which the slabs to be stacked are moved successively in a sidewise direction;

FIGURE 2 is a side elevation of the apparatus shown in FIGURE 1;

FIGURE 3 is an enlarged detail view in side elevation of one of the slab transfer pedestals shown in FIGURE 1;

FIGURE 4 is an enlarged detail plan view of one of the slab stacking machines shown in FIGURE 1;

FIGURE 5 is a side elevation of the stacking machine shown in FIGURE 4 illustrating its arrangement with respect to one of the slab transfer pedestals shown fragmentarily in side elevation;

FIGURE 6 is a sectional view taken along the line VI—VI of FIGURE 4;

FIGURES 7 and 8 are views similar to FIGURE 5 illustrating respectively different operating positions of the stacking machine relative to the slab transfer pedestals;

FIGURES 9, 10, and 11 are respectively side, plan, and end views of one of the slab transfer carriages that forms a part of the stacking machine shown in the preceding figures;

FIGURE 12 is a plan view of a slab stacking carriage or platform that forms a part of the stacking machine and on which the slabs are assembled in stacked position;

FIGURE 13 is an end view looking from the right of FIGURE 12; and

FIGURE 14 is a sectional view taken along the line XIV—XIV of FIGURE 12.

FIGURES 1 and 2 of the drawings show a fragmentary portion of one end of a conventional transfer table 1 that receives steel slabs S, indicated diagrammatically by broken lines, from a rolling mill run-out conveyor. The table 1 is comprised of laterally spaced assemblies of parallel skids 2 on which the slabs S are supported for sliding movement in a sidewise direction by transfer dogs (not shown) operated by a chain drive that includes a pulley 3 mounted on a support 4. At one edge of the table, the slabs S are discharged over the ends 5 of its skids 2. In accordance with the principles of this invention, stacking of the slabs S is effected by a plurality of laterally spaced stacking machines 6 that operate and are constructed in a manner to be described, and a plurality of laterally spaced transfer pedestals 7 for receiving the slabs S as they are discharged over the transfer table skid ends 5 as an incident to their being transferred to the stacking machines 6. As shown in FIGURE 1 of the drawings, the stacking machines 6, preferably three in number, and the pedestals 7 are arranged at spaced intervals along the edge of the table 1, which is defined by the skid ends 5, and lengthwise of the slabs S supported thereon. The machines 6 are respectively disposed in positions spaced outwardly with respect to the skid ends 5, and the transfer pedestals 7 are preferably arranged in pairs at opposite sides of each assembly of skids 2 and in positions intermediate the skid ends 5 and the stacking machines 6.

Each of the pedestals 7, as shown in FIGURE 3, comprises a frame 8 and a base 9 by which it is secured to the floor of the mill. The upper end 10 of the frame 8 is shaped to provide a downwardly sloping skid surface 11 and a ledge 12 projecting outwardly from the lower end of the skid surface 11. The pedestals 7 are mounted in position with their flat portions 13 opposite and at the same vertical level as the transfer table skid ends 5 so that the slabs S are transferred to and received on the skid surfaces 11 as they are discharged from the transfer table 1. As each slab S moves successively over the ends 5 of the transfer table skids 2, it moves with a tilting action onto the downwardly sloping skid surfaces 11, which cooperate to form a common support for the slab at points spaced longitudinally thereof, and gravitates downwardly thereover to a position in which its lower edge 14 engages the ledge 12, as shown in FIGURES 7 and 8, and has its downward movement arrested thereby. In this position, the slab S has its lower edge 14 supported by the ledge 12 and one side 15 thereof resting against the skid surfaces 11.

Each of the stacking machines 6 comprises a slab stacking carriage 16 and a slab transfer carriage 17 that are supported for rectilinear movement on a base member 18, which is bolted to the floor of the mill. In a manner to be described, the slab transfer carriages 17 are reciprocated relative to the transfer pedestals 7 in a direction transversely of the slabs S supported thereon and operate in one direction of reciprocating movement to discharge the lowermost slab S supported on the pedestals 7 for downward lowering movement, and in an opposite direction of reciprocating movement to release such slab for further downward lowering movement to an on-edge position supported on the stacking carriages 16. The manner in which the slabs S are assembled in stacked position on the carriages 16 is best shown in FIGURES 7 and 8.

As best shown in FIGURES 12–14, the stacking carriages 16 are L-shaped and have a horizontal leg that is formed by spaced parallel sides 19. The lower ends 20 of the sides 19 are chamfered and have a slide support on trackways 21 formed on the base 18 (FIGURE 6). A guide 22 arranged centrally of the base 18 projects upwardly into the space between the lower ends 20 of the sides 19 and operates to guide the movement of the carriage 16 over a rectilinear path extending lengthwise of the base 18 and transversely of the slabs supported on the transfer pedestals 8. The upper edges 23 of the spaced sides 19 furnish a platform surface on which the edges of the slabs S have supporting engagement when stacked thereon in a manner to be described. A vertically extending leg 24 at the outer end of the L-shaped carriage 16 has an inwardly facing surface 25 that furnishes a rest for holding the slabs in stacked position on the supporting surfaces 23. The supporting surfaces 23 have an upward angular inclination to the right as viewed in FIGURE 14 and the rest surface 25 is normal to the surfaces 23 so that the slabs S will be tilted against the rest surface 25 when supported on the platform surfaces 23.

An expansible chamber fluid pressure motor 26 is mounted on one end of the base 18 and has a piston rod 27 projecting therefrom which is connected at its outer end 28 to the carriage 16. When the motors 26 are operated to move the piston rods 27 to their extended position, the carriages 16 are moved to the position shown in FIGURE 5 for receiving slabs from the pedestal 7, and a common valve (not shown) is provided for effecting a power stroke of all of the motors 26 in this manner. After the motors 26 are operated in this manner, they are disconnected from the source of fluid pressure which effects their operation so that they function as dashpots during movement of the carriages 16 to the left as viewed in FIGURE 5 in response to slabs being stacked thereon by reciprocating motion of the transfer carriage 17 in a manner to be described.

The stacking carriage sides 19 are provided with inwardly facing grooves 29 that furnish a trackway support over which the transfer carriage 17 is reciprocated. The transfer carriage 17, as best shown in FIGURES 9–11, comprises a center block 30 that has guide bars 31 projecting outwardly from opposite sides thereof that are received in and have a slide support in the grooves 29 formed in the stacking carriage sides 19 as mentioned above. In this manner, the stacking carriage 16 forms a slide support that guides the reciprocating movement of the transfer carriages 17.

A pair of laterally spaced lugs 32 project upwardly from the upper surface 33 of the center block 30 and have pivot openings 34 formed therein to provide a support for a slab pusher dog 35 (see FIGURES 4–6), which is pivotally supported on the lugs 32 by a pivot pin 36 extending through the openings 34. The center block has a vertically extending recess 37 extending downwardly from the space between the dog supporting lugs 32 and in which the lower end 38 of the pusher dog 35 is received when in its upright pushing position as best shown in FIGURE 5. The vertical surface 39 of the center block 30 which defines the inner end of the recess 37 acts as a stop for limiting pivotal movement of the pusher dog out of its upright pushing position shown in FIGURE 5 when the carriage 30 is moved to the left as viewed in this figure. In the upright position of the dog 35 its upper end 40 projects above the transfer pedestal ledge 12 (FIGURE 7) so that it will engage the lower edge of a slab S supported thereon and move it outwardly with respect to the ledge 12 to release it for gravitational lowering movement relative to the pedestals 7 when the carriage 17 is moved to the left as viewed in FIGURE 5.

Reciprocating movement is imparted to the carriage 17 by an expansible chamber reversing motor 41 mounted on the base 18. The reversing motor 41 has a piston rod 42 projecting from one end thereof that is connected to one end of a link 43 which has an operating connection at its other end with a lug 45 projecting outwardly from the lower end of the center block 30 forming part of the transfer carriage 17. Reversing operation of the motors 41 and thereby reciprocating movement of the transfer carriages 17 is under the control of a common reversing valve (not shown), which controls the flow of fluid pressure through connections (not shown) to opposite ends of the motor 41.

In operation, the table 1 delivers slabs S successively to the transfer pedestals 7 for gravitational movement downwardly over the skid surfaces 11 thereon as described above and to a transfer position in which the lower slab edges 14 are supported on the ledges 12 as described above. The stacking carriage motors 26 are actuated to position the carriages 16 relative to the transfer pedestals 7 as shown in FIGURE 5, and the reversing motors 41 are operated to impart a reciprocating movement to the carriages 17. As the carriages 17 move to the left from their retracted positions as shown in FIGURES 5 and 7, the pusher dogs 40 engage the lower edge 14 of a slab S supported on the ledges 12 and move it outwardly over the ledges 12 to release the slab for lowering movement relative to the pedestals 7. At the time the slab lower edge 14 disengages from the pedestal ledges 12 in this manner, the center blocks 30 will have moved to the position shown in FIGURE 8 of the drawings in which they are in front of the pedestals 7 so that the slab gravitates to a position with its lower edge 14 supported on the upper surfaces 33 of the center blocks 30 and its side surface 15 resting against the portions 46 of the pedestals 7 below the ledges 12 as shown in FIGURE 8. As the center blocks 30 move into this position, their end surfaces 47 will engage either the surface 25 on the stacking carriage 16 or the side surface 15 of a slab previously placed on the stacking carriage 16, to move the carriage 16 to the left as viewed in FIGURES 7 and 8 a distance sufficient to provide space for stacking another slab on the carriage 16. As the reversing cycle of each motor 41 is completed, the carriages 17 are returned to the position shown in FIGURE 7 and, during this movement, the center blocks 30 move to the right and their upper surfaces 33 are withdrawn out of supporting engagement with the lower edge 14 of a slab supported thereon, which is thus released for further lowering movement relative to the pedestals 7 and to a position in which its lower edge is supported on the stacking platform surfaces 23. During the next cycle of reversing movement of the motors 41, the end surfaces 47 engage the side surface 15 of the slab thus deposited on the stacking platform surfaces 23 and move it to a stacked position. When a sufficient number of slabs S have been assembled in stacked position on the carriages 16, they can be wired by workmen for removal by a crane to another location. Attention is particularly directed to the fact that the stacking apparatus of this invention, which is comprised of the pedestals 7 and the carriages 16 and 17 operates to assemble the slabs in stacked position without the necessity of manual handling.

While one embodiment of our invention has been shown and described it will be apparent that other adaptations and modifications may be made without departing from the scope of the following claims.

We claim:

1. An apparatus for stacking elongated articles comprising, in combination with a table over which the articles are moved in a sidewise direction and discharged successively from an edge thereof, of a plurality of transfer pedestals at spaced intervals along said table edge cooperating to provide a common support on which each article discharged from said table is received, each of said pedestals having a downwardly sloping skid surface over which the articles received thereon gravitate and a fixed ledge projecting outwardly from the bottom of said surface for stopping the gravitational movement of each article thereover in an inclined position with its lower edge supported on said ledge and one side resting against the lower portion of said skid surface, disengaging means for moving the said article lower edge outwardly over said ledges to release the article supported thereon for further downward gravitational movement relative to said pedestals, and a stacking platform having a supporting surface at a level below said ledges on which the articles released from said pedestals are received in a vertical position with their said lower edges supported on said platform surface.

2. A stacking apparatus as defined in claim 1 characterized by said disengaging means comprising at least a pair of pusher dogs arranged at spaced intervals along the length of an article supported on said ledges and mounted for transverse reciprocating movement relative thereto, said dogs being operative in one direction of reciprocating movement thereof to engage and move the said lower edge of an article supported on said ledges outwardly thereover.

3. A stacking apparatus as defined in claim 1 characterized by said stacking platform comprising at least a pair of L-shaped carriages arranged at spaced intervals along said table edge, each of said carriages having a vertical leg spaced outwardly relative to said transfer pedestals and a horizontal leg projecting inwardly from the lower end of said vertical leg and forming a part of said stacking platform article supporting surface, said vertical leg operating as a rest for supporting articles received on said supporting surface in stacked position, and means mounting said horizontal leg for rectilinear movement in a direction transversely of said table edge.

4. A stacking apparatus as defined in claim 3 characterized further by said disengaging means comprising at least a pair of transfer carriages arranged at spaced intervals along and mounted for reciprocating movement in a direction transversely of said table edge, each of said transfer carriages having a horizontal supporting surface and means effective during one direction of reciprocating movement thereof for disengaging an article from said ledges for gravitational lowering movement to a position with its lower edge supported on said horizontal surfaces and a side thereof resting against said transfer pedestals, said pedestals operating to hold said article against movement by said transfer carriages during reciprocating movement thereof in an opposite direction whereby said horizontal surfaces are withdrawn from underneath the lower edge of an article supported thereon to thereby release it for downward movement onto said platform supporting surface.

5. A stacking apparatus as defined in claim 4 characterized by each of said transfer carriages having a vertical end surface movable during reciprocating movement thereof in said one direction into engagement with the last article deposited on said platform supporting surface for moving it outwardly thereover to a stacked position, and to thereby move said stacking carriages outwardly relative to said transfer pedestals as articles are stacked thereon by reciprocating movement of said transfer carriages.

6. A stacking apparatus as defined in claim 5 characterized by said transfer carriages respectively having a slide support on said L-shaped carriages.

7. An apparatus for stacking elongated articles comprising a plurality of spaced pedestals on which each article to be stacked is received, said pedestals being arranged at spaced intervals along the length of each article received thereon and cooperating to furnish a common support therefor, each of said pedestals having a downwardly sloping skid surface over which each article received thereon gravitates and a ledge projecting outwardly from the bottom of said surface for stopping its gravitational movement thereover in an inclined position with its lower edge supported on said ledge and one side resting against the lower portion of said skid surface, disengaging means for moving the said article lower edge outwardly over said ledges to release the article supported thereon for further downward gravitational movement relative to said pedestals, and a stacking platform having a supporting surface at a level below said ledges on which the articles released from said pedestals are received in a vertical position with their said lower edges supported on said platform surface.

8. An apparatus for stacking elongated articles comprising a plurality of spaced pedestals on which each article to be stacked is received, said pedestals being arranged at spaced intervals along the length of each article received thereon and cooperating to furnish a common support therefor, each of said pedestals having a downwardly sloping skid surface over which each article received thereon gravitates and a ledge projecting outwardly from the bottom of said surface for stopping its gravitational movement thereover in an inclined position with its lower edge supported on said ledge and one side resting against the lower portion of said skid surface, disengaging means comprising at least a pair of transfer carriages arranged at spaced intervals along and mounted for reciprocating movement in a direction transversely of an article supported on said ledges, each of said transfer carriages having a horizontal supporting surface and means effective during one direction of reciprocating movement thereof for disengaging an article from said ledges for lowering movement to a position with its lower edge supported on said horizontal surface and a side thereof resting against said transfer pedestals, said pedestals operating to hold said article against movement by said transfer carriages during reciprocating movement thereof in an opposite direction whereby said horizontal surfaces are withdrawn from underneath the lower edge of an article supported thereon to thereby release it for further downward movement relative to said pedestals, and a stacking platform having a supporting surface at a level below said horizontal surface on which the articles released from said pedestals are received in a vertical position with their said lower edges supported on said platform surface.

9. A stacking apparatus as defined in claim 8 characterized by said stacking platform comprising at least a pair of L-shaped carriages arranged at spaced intervals lengthwise of the articles to be stacked thereon, each of said carriages having a vertical leg spaced outwardly relative to said transfer pedestals and a horizontal leg projecting inwardly from the lower end of said vertical leg and forming a part of said stacking platform article supporting surface, said vertical leg operating as a rest for supporting articles received on said supporting surface in stacked position, and means mounting said horizontal leg for rectilinear movement in a direction transversely of the articles stacked thereon.

10. A stacking apparatus as defined in claim 9 characterized by said transfer carriages respectively having a slide support on said L-shaped carriages.

11. An apparatus for stacking elongated articles as they are discharged successively in a sidewise direction from an edge of a transfer table comprising, in combination with said table, a stacking mechanism comprising a pair of L-shaped stacking carriages arranged at spaced intervals along the length of and spaced outwardly from said table edge and mounted for movement in a direction transversely thereof, each of said carriages having a horizontal leg furnishing a support for the articles to be stacked thereon and a vertical leg projecting upwardly from an end thereof remotely located with respect to said table edge, at least a pair of laterally spaced transfer pedestals disposed between said table edge and said stacking carriages and being adapted to receive and to furnish a common support for holding said articles in stationary positions as they are discharged from said table edge, and reciprocating means operating during each cycle of reciprocating movement thereof to dislodge said articles successively from said pedestals for gravitational lowering movement to a stacked position supported on the horizontal legs of said stacking carriages.

12. An apparatus for stacking elongated articles as they are discharged successively in a sidewise direction from an edge of a transfer table comprising, in combination with said table, a stacking mechanism comprising a pair of L-shaped stacking carriages arranged at spaced intervals along the length of and spaced outwardly from said table edge and mounted for movement in a direction transversely thereof, each of said carriages having a horizontal leg furnishing a support for the articles to be stacked thereon and a vertical leg projecting upwardly from an end thereof remotely located with respect to said table edge, at least a pair of laterally spaced transfer pedestals disposed between said table edge and said stacking carriages and being adapted to receive and to furnish a common support for said articles as they are discharged from said table edge, each of said pedestals having a downwardly sloping skid surface over which each article received thereon gravitates and a ledge projecting outwardly from the bottom of said surface for stopping its gravitational movement thereover in an inclined position with its lower edge supported on said ledge and one side resting against the lower portion of said skid surface, and reciprocating means operating during each cycle of reciprocating movement thereof for moving the said article lower edge outwardly over said ledges for gravitational lowering movement to a stacked position with its said lower edges supported on the horizontal legs of said stacking carriages.

13. A stacking apparatus as defined in claim 12 characterized by said reciprocating means comprising a pair of transfer carriages respectively having a slide support on the said horizontal legs of said stacking carriages.

14. An apparatus for stacking elongated articles comprising, in combination with a table over which the articles are moved in a sidewise direction and dicharged successively from an edge thereof, of a plurality of transfer pedestals at spaced intervals along said table edge cooperating to provide a common support on which each article discharged from said table is received, each of said pedestals having a downwardly sloping skid surface over which the articles received thereon gravitate and a fixed ledge projecting outwardly from the bottom of said surface for stopping the gravitational movement of each article thereover in an inclined position with its lower edge supported on said ledge and one side resting against the lower portion of said skid surface, disengaging means for moving the said article lower edge outwardly over said ledges to release the article supported thereon for further downward gravitational movement relative to said pedestals, and a stacking platform having a supporting surface at a level below said ledges on which the articles released from said pedestals are received in a vertical position with their said lower edges supported on said platform surface, said disengaging means comprising at least a pair of pusher dogs arranged at spaced intervals along the length of an article supported on said ledges and mounted for transverse reciprocating movement relative thereto, said dogs being operative in one direction of reciprocating movement thereof to engage and move the said lower edge of an article supported on said ledges outwardly thereover, each of said pusher dogs having a supporting carriage mounted for reciprocating movement and a pivotal support thereon, stops respectively on said carriages for holding said dogs against pivotal movement and in an upright pushing position during movement by said carriage in said one direction, said dogs being pivotal on said carriage to a retracted and inoperative pushing position upon engagement with a succeeding article supported on said ledges during movement of said carriages in an opposite direction.

15. An apparatus for stacking elongated articles as they are discharged successively in a sidewise direction from an edge of a transfer table comprising, in combination with said table, a stacking mechanism comprising a pair of L-shaped stacking carriages arranged at spaced intervals along the length of and spaced outwardly from said table edge and mounted for movement in a direction transversely thereof, each of said carriages having a horizontal leg furnishing a support for the articles to be stacked thereon and a vertical leg projecting upwardly from an end thereof remotely located with respect to said table edge, at least a pair of laterally spaced transfer pedestals disposed between said table edge and said stacking carriages and being adapted to receive and to furnish a common support for said atricles as they are discharged from said table edge, each of said pedestals having a downwardly sloping skid surface over which each article received thereon gravitates and a ledge projecting outwardly from the bottom of said surface for stopping its gravitational movement thereover in an inclined position with its lower edge supported on said ledge and one side resting against the lower portion of said skid surface, and reciprocating means operating during each cycle of reciprocating movement thereof for moving the said article lower edge outwardly over said ledges for gravitational lowering movement to a stacked position with its said lower edge supported on the horizontal legs of said stacking carriages, said reciprocating means comprising a pair of transfer carriages respectively having a slide support on the said horizontal legs of said stacking carriages, a pair of pusher dogs having pivotal supports respectively on said transfer carriages for reciprocating movement therewith, stops on said transfer carriages for holding said dogs against pivotal movement and in an upright article pushing position during movement of said transfer carriages in one direction of reciprocating movement thereof, said dogs being operative in said one direction of reciprocating movement to engage and move the lower edge of an article supported on said pedestal ledges outwardly thereover, and being pivotal on said transfer carriages to a retracted position upon engagement with a succeeding article supported on said ledges during movement of said transfer carriages in an opposite direction.

References Cited in the file of this patent

UNITED STATES PATENTS

| | | |
|---|---|---|
| 1,231,028 | Jordan | June 26, 1917 |
| 1,683,982 | McArthur | Sept. 11, 1928 |
| 2,130,171 | Zsamboky | Sept. 23, 1938 |
| 2,586,172 | Murphy | Feb. 19, 1952 |